United States Patent Office 2,886,545
Patented May 12, 1959

2,886,545
THERMOPLASTIC COMPOSITION PLASTICIZED WITH A MIXED DIESTER PLASTICIZER OF AN ALIPHATIC DIOL HAVING TWO PRIMARY ALCOHOL GROUPS

Philip H. Rhodes and Paul L. Imes, Cincinnati, Ohio, assignors, by mesne assignments, to said Philip H. Rhodes No Drawing. Application July 21, 1954
Serial No. 444,914

14 Claims. (Cl. 260—27)

The present invention relates to a thermoplastic composition comprising a thermoplastic base and a plasticizer, said plasticizer comprising a mixed diester of an aliphatic diol having two primary alcohol groups.

While the present invention is primarily directed to the production of a plasticized polyvinyl resin composition, other thermoplastic bases may be plasticized in accordance with the present invention.

There is produced in accordance with the present invention a thermoplastic composition comprising a thermoplastic base plasticized with a diester reaction product of a molecular quantity of an aliphatic diol having two primary alcohol groups; a molecular quantity of a first reactant supplying a monobasic acid radical selected from the group consisting of a monobasic aliphatic acid radical having from two to ten carbon atoms therein, and a monobasic aromatic acid radical having seven to ten carbon atoms therein.

There is also reacted with the aliphatic diol and monobasic acid radical material a molecular quantity of an additional reactant supplying a monobasic fatty acid radical selected from the group consisting of a monobasic unsaturated fatty radical, and mixtures of a monobasic saturated and unsaturated fatty acid radical, the major portion of said fatty acid radical being an unsaturated fatty acid, said fatty acid radical having from fourteen to twenty-two carbon atoms therein, said additional reactant supplying about 60% to about 80% of the total reactant acid radical, said percentages being taken on the weight of the total acid radicals. Preferably, said first reactant supplies about 40% to about 20% of the total reactant acid radicals.

The plasticizer used in carrying out the present invention may be produced using any of the prior art methods for producing esters but the preferred method comprises reacting the acid chlorides of the monobasic aliphatic acids or the monobasic aromatic acids in molecular proportions with the aliphatic diol, following which the so-produced mono ester is then further reacted with the molecular equivalent of the monobasic fatty acid, the major portion of said fatty acid being an unsaturated fatty acid as, for example, soya fatty acid, thus producing the mixed diester which is utilized as the plasticizer in the present invention.

While it has been stated that soya fatty acid is illustrative of the fatty acid which may be used in producing the plasticizer utilized in carrying out the present invention, it is desired to point out that the unsaturated fatty acid radical used in producing the plasticizer may have from fourteen to twenty-two carbon atoms in the radical. As pointed out, the monobasic fatty acid radical is reacted in molecular quantity. It will be found that this additional reactant supplies from about 60% to about 80% of the total reactant acid radicals, there being two acid radicals reacted with the aliphatic diol to produce the plasticizer utilized in carrying out the present invention.

Likewise, it may be pointed out that, while a molecular qantity of the first reactant, as exemplified by benzoyl chloride, is reacted in a molecular quantity with the aliphatic diol, such first reactant supplies from about 40% to about 20% of the total reactant acid radicals.

It is desired to point out that in the examples herein set forth the aliphatic diol as, for example, diethylene glycol is reacted with a monobasic aliphatic acid chloride or a monobasic aromatic acid chloride as, for example, benzoyl chloride, the reaction being between molecular quantities. However, instead of using a monobasic acid chloride, there may be used the acid itself, the anhydrides thereof or the aliphatic diol may be reacted with any compound which by interchange produces the desired mono ester. It is for this reason that applicants do not desire to be limited to the reaction of the aliphatic diol with the aliphatic or aromatic acid chloride.

Therefore, in defining the invention it is thought best to state that the aliphatic diol is reacted with a molecular quantity of a first reactant supplying a monobasic acid radical selected from the group consisting of a monobasic aliphatic acid radical, and a monobasic aromatic acid radical. These generic expressions will cover the use of chloride, the anhydrides, the acid and equivalent compounds.

The present invention will be illustrated by the following examples:

EXAMPLE 1

106 grams of diethylene glycol are introduced into a flask and heated to about 100° C. to 115° C. Thereafter 140 grams of benzoyl chloride is added drop-wise at a rate to maintain the temperature between about 110° C. and 125° C. After the total amount of benzoyl chloride is added, the temperature of the reaction mixture is raised to about 150° C. to 160° C. where it is maintained until the evolution of hydrochloric acid is completed. This stage of the reaction represents one mol of diethylene glycol being reacted with one mol of benzoyl chloride to form a monoester of an aliphatic diol having two primary alcohol groups.

The above prepared ester is then reacted with a molecular proportion of a fatty acid. In this particular example, 286 grams of soya fatty acid is added to the reaction mixture and, in addition, 5 grams of paratoluene sulfonic acid is also added as an esterification catalyst. The temperature of the reaction mixture is raised to between 150° C. to 250° C. and is maintained in this temperature range until the evolution of water is completed, that is, until a mol of water has been liberated. The final reaction product, which now consists principally of the benzoyl soya diester of diethylene glycol, is then treated with a neutralizing agent, as for example an alkali hydroxide such as sodium or potassium hydroxide, an alkali carbonate such as sodium or potassium carbonate or any equivalent prior art neutralizing agent which serves the function of neutralizing the catalyst. In order to produce a diester having the best color properties, the second stage of the reaction, that is the reaction between the ethylene glycol benzoyl monoester and the unsaturated fatty acid, would be carried out in an inert atmosphere, as for example under a blanket of carbon dioxide or nitrogen. The product if desired may be further purified by distillation under vacuum, as is well known.

The resulting diester may then be utilized as a plasticizer in carrying out the present invention and for the production of a thermoplastic composition including thermoplastic resins and, more particularly, polyvinyl resins including polyvinyl chloride resins. For example, 100 parts of polyvinyl chloride resin, 40 parts of the above produced mixed diester, 2 parts of stabilizer and one part of lubricant may be mixed and milled on a hot 2-roll rubber mill to produce a uniformly mixed sheet of plasticized polyvinyl chloride material. The physical properties of this compound, as well as compounds produced similarly from other mixed diesters, are set forth hereafter in Table B. The physical properties of the above produced diester plasticizer and the properties of those produced in the following examples are hereinafter set forth in Table A.

EXAMPLE 2

78 grams acetyl chloride
106 grams diethylene glycol
286 grams soya fatty acid
5 grams para toluene sulfonic acid The above raw materials are reacted in the manner of Example 1, that is, the diethylene glycol and the acetyl chloride are reacted following which the soya fatty acid and para toluene sulfonic acid are added and the esterification completed.

EXAMPLE 3

140 grams benzoyl chloride
62 grams ethylene glycol
286 grams soya fatty acid
5 grams acid esterification catalyst The above raw materials are reacted in the manner of Example 1, that is, the ethylene glycol and benzoyl chloride are reacted following which the soya fatty acid and acid esterification catalyst are added and the esterification completed.

EXAMPLE 4

140 grams benzoyl chloride
200 grams Polyethylene Glycol 200
286 grams soya fatty acid
5 grams acid esterification catalyst The above raw materials are reacted in the manner of Example 1, that is, the Polyethylene Glycol 200 and benzoyl chloride are reacted following which the soya fatty acid and acid esterification catalyst are added and the esterification completed.

Polyethylene Glycol 200 is a product produced by Carbide & Carbon Chemicals Corp. and is described in their publication entitled "Physical Properties of Synthetic Organic Chemicals" as being a member of the polyalkylene glycol group which are polymers of the lower glycols ranging in molecular weight from approximately 200 up to 6,000. With one exception (Carbowax 1500) the numbers used in naming these products indicate approximate average molecular weight.

EXAMPLE 5

140 grams benzoyl chloride
300 grams Polyethylene Glycol 300
286 grams soya fatty acid
5 grams acid esterification catalyst The above raw materials are reacted in the manner of Example 1, that is, the Polyethylene Glycol 300 and benzoyl chloride are reacted following which the soya fatty acid and acid esterification catalyst are added and the esterification completed.

Polyethylene Glycol 300 is a product produced by Carbide & Carbon Chemicals Corp. and is described in their publication entitled "Physical Properties of Synthetic Organic Chemicals" as being a member of the polyalkylene glycol group which are polymers of the lower glycols ranging in molecular weight from approximately 200 up to 6,000. With one exception (Carbowax 1500) the numbers used in naming these products indicate approximate average molecular weight.

EXAMPLE 6

140 grams benzoyl chloride
300 grams Polyethylene Glycol 300
203 grams Emersol 9315
5 grams acid esterification catalyst The above raw materials are reacted in the manner of Example 1, that is, the Polyethylene Glycol 300 and benzoyl chloride are reacted following which the Emersol 9315 and acid esterification catalyst are added and the esterification completed.

Emersol 9315 is a fatty acid mixture sold under this trade name by Emery Industries and is described in their literature as polyethyleneic fatty acids from which most of the saturated fatty acids have been removed. As a result, their content of total poly-unsaturates is higher and their linolenic acid content is relatively low.

EXAMPLE 7

140 grams benzoyl chloride
300 grams Polyethylene Glycol 300
385 grams Baker #106 Crude Ricinoleic Acid
5 grams acid esterification catalyst The above raw materials are reacted in the manner of Example 1, that is, the Polyethylene Glycol 300 and benzoyl chloride are reacted following which the Baker #106 Crude Ricinoleic Acid and the acid esterification catalyst are added and the esterification completed.

Baker #106 is a product of Baker Castor Oil Company and is described as a crude fatty acid of dehydrated castor oil consisting of a mixture of octadecadienoic and ricinoleic fatty acids with some glycerine present as an ester of these acids.

EXAMPLE 8

140 grams benzoyl chloride
106 grams diethylene glycol
276 grams Emersol 233
5 grams acid esterification catalyst The above raw materials are reacted in the manner of Example 1, that is, the diethylene glycol and benzoyl chloride are reacted following which the Emersol 233 and acid esterification catalyst are added and the esterification completed.

Emersol 233 is sold under this trade name by Emery Industries and is described as a high purity oleic acid having a maximum of 5% polyunsaturates and a low linoleic acid content.

In addition to utilizing unsaturated fatty acids of the type hereinbefore set forth, there may also be utilized tall oil fatty acids or rosin fatty acids. The principal reactive acid in rosin and tall oil is abietic acid having an empirical formula $C_{19}H_{29}COOH$ which may be more fully described as mono carboxylic acids of alkylated phenanthrene nuclei. These acids have two double bonds.

Examples of reactions utilizing fatty acids from tall oils, and rosin, are illustrated below:

EXAMPLE 9

140 grams benzoyl chloride
106 grams diethylene glycol
337 grams Wood Rosin Grade WG
5 grams acid esterification catalyst The above raw materials are reacted in the manner of Example 1, that is, the diethylene glycol and benzoyl chloride are reacted following which the Wood Rosin Grade WG and acid esterification catalyst are added and the esterification completed.

Wood Rosin Grade WG is roughly 90% isomeric resin-acids and 10% nonacid constituents. The Grade WG designates color of the material which, in this case, is a pale straw color.

EXAMPLE 10

140 grams benzoyl chloride
106 grams diethylene glycol
334 grams Wood Rosin Grade WW
5 grams acid esterification catalyst The above raw materials are reacted in the manner of Example 1, that is, the diethylene glycol and benzoyl chloride are reacted following which the Wood Rosin Grade WW and acid esterification catalyst are added and the esterification completed.

Wood Rosin Grade WW has roughly the same composition as Grade WG except that it is lighter in color.

EXAMPLE 11

140 grams benzoyl chloride
106 grams diethylene glycol
377 grams Poly-Pale Resin
5 grams acid esterification catalyst The above raw materials are reacted in the manner of Example 1, that is, the diethylene glycol and benzoyl chloride are reacted following which the Poly-Pale Resin and acid esterification catalyst are added and the esterification completed.

Poly-Pale Resin is a trade name for a product produced by Hercules Powder Co. and is described as being a polymerized rosin containing approximately 40% of the dimer of abietic acid.

EXAMPLE 12

140 grams benzoyl chloride
106 grams diethylene glycol
326 grams Unitol S
5 grams acid esterification catalyst The above raw materials are reacted in the manner of Example 1, that is, the diethylene glycol and benzoyl chloride are reacted following which the Unitol S, and acid esterification catalyst are added and the esterification completed.

Unitol S is a trade name for a refined tall oil produced by the Union Bag & Paper Co.

EXAMPLE 13

140 grams benzoyl chloride
300 grams Polyethylene Glycol 300
326 grams Unitol S
5 grams acid esterification catalyst The above raw materials are reacted in the manner of Example 1, that is, the Polyethylene Glycol 300 and benzoyl chloride are reacted following which the Unitol S and acid esterification catalyst are added and the esterification completed.

In order to demonstrate the compatibility of the plasticizers in the present invention, samples of the plasticizers produced in the preceding examples were mixed on a 50:50 basis with tricresyl phosphate, a well known prior art plasticizer, and 40 parts of these mixtures were compounded on a 2-roll rubber mill with 100 parts of polyvinyl chloride resin and a stabilizer until a smooth uniformly compounded sheet was produced. The physical properties resulting from the plasticized polyvinyl chloride prepared from 100 parts of polyvinyl chloride resin, 20 parts of tricresyl phosphate and 20 parts of the plasticizer of the present invention are shown in Table C.

The acid chlorides used in the preferred method for carrying out the manufacture of the herein disclosed plasticizer may be written generically as RCOCl where R is an alkyl radical containing from 1 to 9 carbon atoms or may be an aryl radical. Examples of the alkyl radicals are acetyl, propionyl, butyryl and other aliphatic radicals having from 1 to 9 carbon atoms. Examples of the aryl acid chlorides are benzoyl chloride, toluyl chloride, paramethyl benzoyl chloride, dimethyl benzoyl chloride, polyethyl benzoyl chloride and the like.

Generically, the reaction between the acid chloride and the aliphatic diol may be written as follows:

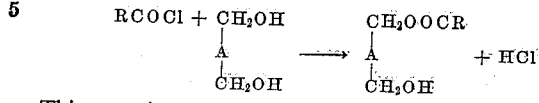

This reaction product thus comprises a monoester of the aliphatic diol. The latter is then reacted with the unsaturated fatty acid to produce the mixed diester of the aliphatic diol, this reaction being shown generically by the following:

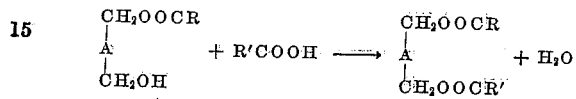

where R' is an unsaturated fatty acid radical having 13 to 21 carbon atoms. Illustratively, the mono-unsaturated fatty acids or the monoethenoid fatty acids, having the formula of $C_nH_{2n-2}O_2$ may be myristoleic, palmitoleic, gadoleic, oleic, erucic and the like. Instead of using the mono-unsaturated fatty acids, it is preferred to use the poly-unsaturated fatty acids, also known as polyethenoid acids, said acids being set forth on page 28 of the book entitled "Fatty Acids" by Klare S. Markley, published in 1947 by Interscience Publishers, Inc., New York.

It is also within the province of the present invention to use as the unsaturated fatty acid the hydroxy unsaturated fatty acid typified by ricinoleic acid. It is desired to point out that the advance in the art consists in preparing a thermoplastic composition which is plasticized with a diester reaction product of a molecular quantity of an aliphatic diol, a molecular quantity of the first reactant comprising the monobasic acid radical as set forth, and a molecular quantity of an additional reactant supplying a monobasic fatty acid radical, the fatty acid radical being present in an amount much greater by weight than has heretofore been known in the prior art.

In other words, in the prior art the suggestion has been made that the amount of mono-unsaturated fatty acid be between 10% and 50%. In accordance with the present invention the amount of the fatty acids is at least 60% and preferably is from 70% to 80% of the total reactant acid radicals.

Further, in accordance with the present invention, as stated, it is preferred to use the more highly unsaturated fatty acids as, for example, soya fatty acids which are high in linoleic acid content. It is believed that the double bonds available in the more highly unsaturated fatty acids lends substantial heat and light stability to the thermoplastic compositions plasticized with the diesters prepared using the high amounts of higher unsaturated fatty acids due to the availability of the double bonds as chlorine acceptors for the chlorine believed to be liberated during the break-down under heat and light of chlorine containing polymers as, for example, polyvinyl chloride or vinylidene chloride.

These acids all have at least one unsaturated bond and others, as for example, linoleic, linolenic, etc., have more than one unsaturated bond. Instead of using a pure acid, a mixture of unsaturated fatty acids may be used, or a mixture of fatty acids in which the predominating portion is unsaturated may be used. Examples of the latter are soya fatty acids having a typical composition of about 72% unsaturated fatty acids, the balance being saturated fatty acids. In the case of cotton seed acids, again about 72% is unsaturated and the balance is saturated. The basic requirement is that the major portion of the fatty acid material utilized be unsaturated fatty acids. In carrying out the reactions for making the plasticizers utilized in carrying out the present invention, the molecular equivalent of fatty acid is calculated from the acid number of the composition. Instead of carrying out the second phase of the esterification reaction by the conventional esterification procedure well known in the art, the acid chloride of the unsaturated fatty acid may be utilized instead of the fatty acid itself in which case the second step of the reaction proceeds at a much more rapid rate and with the liberation of hydrochloric acid as in the first step of the reaction.

The following Table A sets forth the properties of the diester plasticizers produced as herein set forth.

*Table A*

PROPERTIES OF THE HEREIN PRODUCED DIESTER PLASTICIZERS

| Example No. | Probable Molecular Weight | Boiling Range, °C. | Specific Gravity | Acid No. | Saponification No. | Iodine No. |
|---|---|---|---|---|---|---|
| 1 | 473 | 275–295 at 6 mm | 1.006 | 10–25 | 228–237 | 80 |
| 2 | 411 | | | 10 | 265–272 | 92 |
| 3 | 429 | | | 27 | 262 | 88 |
| 4 | 567 | 215–325 at 2 mm | 1.024 | 20 | 198 | 67 |
| 5 | 667 | | | 15 | 162–169 | 57 |
| 6 | 611 | 265–336 at 2 mm | 1.045 | 16 | 174 | 85 |
| 7 | 791 | 209–316 at 2 mm | 1.012 | 1 | 166 | 58 |
| 8 | 472 | 170–286 at 2 mm | 1.036 | 23 | 237 | 51 |
| 9 | 529 | | | | | |
| 10 | 508 | 154–307 at 2 mm | 1.102 | 50 | 172 | |
| 11 | 570 | 193–330 at 2 mm | 1.120 | 52 | 191 | 101 |
| 12 | 518 | 163–270 at 2 mm | 1.066 | 41 | 216 | 86 |
| 13 | 712 | 232–306 at 2 mm | 1.078 | 36 | 152 | 84 |

The following Table B sets forth the physical properties of the polyvinyl chloride compositions plasticized with certain of the herein produced diester plasticizers.

*Table B*

PHYSICAL PROPERTIES OF THE POLYVINYL COMPOSITIONS PLASTICIZED WITH THE DIESTER PLASTICIZER

| Example No. | Elmendorf, Grams/Mil | | Tensile, p.s.i. | | Percent Elongation | | 100% Modulus | | Low Temp. Brittle Point, °F. | Weight Loss Oven Aging 5 Days at 230° F., Percent |
|---|---|---|---|---|---|---|---|---|---|---|
| | MD | CD | MD | CD | MD | CD | MD | CD | | |
| 6 | 270 | 255 | 3,400 | 3,300 | 310 | 300 | 2,300 | 2,300 | −50 | |
| 7 | 210 | 200 | 3,600 | 3,700 | 190 | 220 | 3,200 | 3,200 | −35 | |
| 10 | 16 | 17 | 6,100 | 5,800 | 5 | 5 | | | | 4.6 |
| 11 | 30 | 33 | 6,100 | 5,500 | | | | | >−20 | |
| 13 | 120 | 140 | 3,600 | 3,700 | 230 | 250 | 3,000 | 3,000 | | |

The following Table C sets forth the physical properties of the polyvinyl chloride compositions compounded with equal parts by weight of tricresyl phosphate and the herein produced diester plasticizers, at the level of 40 parts of the total plasticizer for 100 parts by weight of the polyvinyl chloride resin.

sheet, that is across the width of the material and the result then reported is "cross direction" or CD.

In producing the thermoplastic composition of the present invention, the plasticizers formulated as above set forth were mixed first with equal parts of tricresyl phosphate, the latter being a plasticizer well known in the art. 40 parts of the mixture of tricresyl phosphate and the diester plasticizer produced as herein set forth was compounded on a two roll rubber mill with 100 parts of polyvinyl chloride resin together with a stabilizer as well known in the art until a smooth uniformly compounded sheet was produced. The physical properties of the resulting thermoplastic polyvinyl chloride resin composition prepared from 100 parts of polyvinyl chloride resin, 20 parts of tricresyl phosphate and 20 parts of plasticizers of the present invention, are set forth in Table C.

*Table C*

| Example No. | Elmendorf, Grams/Mil | | Tensile, p.s.i. | | Percent Elongation | | 100% Modulus | | Low Temp. Brittle Point, °F. | Weight Loss Oven Aging 5 Days at 230° F., Percent |
|---|---|---|---|---|---|---|---|---|---|---|
| | MD | CD | MD | CD | MD | CD | MD | CD | | |
| 1 | 260 | 320 | 3,500 | 3,600 | 250 | 260 | 2,700 | 2,800 | −18 | 7.3 |
| 2 | 270 | 340 | 3,800 | 3,500 | 250 | 210 | 2,900 | 2,800 | −20 | 6.2 |
| 3 | 40 | 50 | 3,200 | 3,500 | 65 | 75 | | | −6 | 3.3 |
| 4 | 90 | 150 | 3,500 | 3,500 | 250 | 230 | 3,000 | 2,700 | 0 | .03 |
| 6 | 340 | 420 | 4,100 | 3,700 | 340 | 300 | 2,700 | 2,600 | | |
| 7 | 260 | 300 | 4,000 | 3,700 | 240 | 220 | 3,300 | 3,100 | −10 | 10.3 |
| 8 | 310 | 300 | 3,700 | 3,500 | 230 | 220 | 2,700 | 2,600 | >−20 | 4.5 |
| 9 | 45 | 40 | 5,400 | 4,900 | 25 | 30 | | | | 6.8 |
| 10 | 25 | 25 | 5,000 | 5,100 | 40 | 40 | | | | |
| 11 | 200 | 330 | 4,100 | 3,700 | 210 | 215 | 3,500 | 3,200 | >−20 | 10.7 |
| 12 | 80 | 70 | 4,100 | 3,800 | 240 | 160 | 3,800 | 3,600 | −10 | |
| 13 | 50 | 60 | 3,900 | 4,000 | 200 | 200 | 3,400 | 3,400 | 0 | |

Referring to Tables B and C, the notation "Elmendorf, grams/mil" defines the resistance to tearing as measured on the Elmendorf tear-testing machine The abbreviations "MD" and "CD" respectively denote "machine direction" and "machine cross direction." If the tear strength, for example, is measured along the axis of the formation of the film that is a long direction and it then is called the "machine direction" or MD. When the tear test is taken across the axis of formation of the film or While, in the above example, the diester plasticizer is present in the amount of 20 parts per hundred parts of polyvinyl chloride resin, it is within the province of the present invention to compound the resin composition with the diester plasticizer being present in greater or smaller amounts as, for example, for 100 parts of the polyvinyl chloride resin the plasticizer may be present in 3 parts to 150 parts taken per 100 parts of the polyvinyl chloride resin In other words, in carrying out the present invention the diester plasticizer may be incorporated in the polyvinyl chloride resin in the same amount as is customary in the prior art.

In the above example, the tricresyl phosphate has been used as an additional plasticizer, this being also customary in the prior art. For the tricresyl phosphate there may be substituted other prior art plasticizers as, for example, phthalate esters, other phosphate esters and the like.

Generically the aliphatic diol may be written in the following manner:

where "A" stands for $(CH_2OCH_2)_n$, where "$n$" may be zero as in ethylene glycol and may be one, as in diethylene glycol and may be 2, as in triethylene glycol, 4 as in pentaethylene glycol, and the like. The basic requirement for the diol is that it be provided with 2 primary alcohol groups. Instead of using saturated glycols unsaturated glycols may be used. An example of an unsaturated glycol which can be used in carrying out the present invention is butynediol or its equivalent.

While the invention has been principally described in connection with polyvinyl resins, the plasticizers used in carrying out the present invention are also useful in plasticizing other thermoplastic resins and synthetic and natural elastomers, as for example, cellulose acetate, cellulose acetate butyrate, polystyrene, natural rubber, butadiene-acrylonitrile rubbers, butadiene styrene rubbers and the like.

In the examples herein set forth the acid esterification catalyst may be para-toluene sulfonic acid or any of the prior art acid esterification catalysts, as for example, concentrated sulphuric acid, phosphorous pentoxide, zinc chloride, dry hydrogen chloride, and the like.

In place of the acid chlorides set forth in the hereinbefore specified examples, the acids themselves or the acid anhydrides may be utilized. For example, in place of acetyl chloride there may be used acetic acid or acetic anhydride; in place of propionyl chloride there may be used propionic acid or propionic anhydride; in place of butyryl chloride there may be used butyric acid or butyric anhydride; in place of benzoyl chloride there may be used benzoic acid. In general, as long as the proper molecular quantities of the acid radical are present it may be supplied from the acid, the acid anhydride or the acid chloride or even mixtures thereof.

The thermoplastic base may be selected from the group consisting of thermoplastic polymers of vinyl chloride, co-polymers of vinyl chloride and lower alkyl esters of vinyl alcohol, co-polymers of vinyl chloride and vinylidine chloride, said co-polymers of vinyl chloride containing at least 70% by weight of the vinyl chloride and up to 30% by weight of unsaturated monomer co-polymerized therewith.

We claim:

1. A thermoplastic composition comprising a thermoplastic base, plasticized with the diester reaction-product of a molecular quantity of an unsubstituted aliphatic diol having two primary alcohol groups, a molecular quantity of a first reactant supplying a monobasic acid radical selected from the group consisting of a monobasic aliphatic acid radical having 2 to 10 carbon atoms therein, and a monobasic aromatic acid radical having 7 to 10 carbon atoms therein; a molecular quantity of an additional reactant supplying a monobasic saturated and a poly-unsaturated fatty acid radical, the major portion of said fatty acid radical being a poly-unsaturated fatty acid radical, said fatty acid radical having from 14 to 22 carbon atoms therein, said additional reactant supplying about 60% to about 80% of the total reactant acid radicals, said percentages being taken on the weight of the total acid radicals, said thermoplastic base being selected from the group consisting of polyvinyl chloride and co-polymers of vinyl chloride and vinylidene chloride, said co-polymers containing at least 70% by weight of the vinyl chloride and up to 30% by weight of the vinylidene chloride co-polymerized therewith.

2. The thermoplastic composition defined in claim 1 in which the first reactant supplies a monobasic aliphatic acid radical having from 2 to 10 carbon atoms in the radical.

3. The thermoplastic composition defined in claim 1 in which the first reactant supplies a monobasic aromatic acid radical having from 7 to 10 carbon atoms in the radical.

4. The thermoplastic composition defined in claim 1 in which the major portion of the fatty acid radical is a linoleic acid radical.

5. The thermoplastic composition defined in claim 1 in which the first reactant supplies a benzoic acid radical.

6. The thermoplastic composition defined in claim 1 in which the aliphatic diol is a polyethylene glycol.

7. The thermoplastic composition defined in claim 1 in which the aliphatic diol is a diethylene glycol.

8. The thermoplastic composition defined in claim 1 in which the diol is first reacted with the first reactant and then reacted with the additional reactant.

9. A thermoplastic composition comprising a thermoplastic base, plasticized with the diester reaction-product of a molecular quantity of an unsubstituted aliphatic diol having two primary alcohol groups, a molecular quantity of a first reactant supplying a monobasic acid radical selected from the group consisting of a monobasic aliphatic acid radical having 2 to 10 carbon atoms therein, and a monobasic aromatic acid radical having 7 to 10 carbon atoms therein; a molecular quantity of an additional reactant supplying a monobasic acid constituent radical selected from the group consisting of rosin acid radicals and radicals of tall oil fatty acids, the major portion of said acid radical being the abietic acid radical, said additional reactant supplying about 60% to about 80% of the total reactant acid radicals, said percentages being taken on the weight of the total acid radicals, said thermoplastic base being selected from the group consisting of polyvinyl chloride and co-polymers of vinyl chloride and vinylidene chloride, said co-polymers containing at least 70% by weight of the vinyl chloride and up to 30% by weight of the vinylidene chloride co-polymerized therewith.

10. A thermoplastic composition comprising a thermoplastic base, plasticized with the diester reaction-product of a molecular quantity of diethylene glycol, a molecular quantity of benzoyl chloride, and a molecular quantity of soya fatty acids, the latter supplying about 60% to about 80% of the acid radicals reacting with the diethylene glycol, said percentages being taken on the weight of the total acid radicals present in the diester reaction-product, said thermoplastic base being selected from the group consisting of polyvinyl chloride and co-polymers of vinyl chloride and vinylidene chloride, said co-polymers containing at least 70% by weight of the vinyl chloride and up to 30% by weight of the vinylidene chloride co-polymerized therewith.

11. A thermoplastic composition comprising a thermoplastic base, plasticized with the diester reaction-product of a molecular quantity of diethylene glycol, a molecular quantity of benzoyl chloride, and a molecular quantity of tall oil fatty acids, the latter supplying about 60% to about 80% of the total acid radicals reacting with the diethylene glycol, said percentages being taken on the weight of the total acid radicals present in the diester reaction-product, said thermoplastic base being selected from the group consisting of polyvinyl chloride and co-polymers of vinyl chloride and vinylidene chloride, said co-polymers containing at least 70% by weight of the vinyl chloride and up to 30% by weight of the vinylidene chloride co-polymerized therewith.

12. A thermoplastic composition comprising a thermoplastic base, plasticized with the reaction-product of a polyethylene glycol, a molecular quantity of benzoyl chloride, and a molecular quantity of soya fatty acids, the latter supplying about 60% to about 80% of the total acid radicals reacting with the polyethylene glycol, said percentages being taken on the weight of the total acid radicals present in the reaction-product, said thermoplastic base being selected from the group consisting of polyvinyl chloride and co-polymers of vinyl chloride and vinylidene chloride, said co-polymers containing at least 70% by weight of the vinyl chloride and up to 30% by weight of the vinylidene chloride co-polymerized therewith.

13. A resinous composition comprising a co-polymer of at least 70% by weight of vinyl chloride and up to 30% by weight of vinylidene chloride, said co-polymer being plasticized with a diester reaction-product of diethylene glycol, benzoyl chloride and soya fatty acids, the latter supplying about 60% to about 80% of the total acid radicals reacting with the diethylene glycol.

14. A thermoplastic composition comprising a thermoplastic base, plasticized with the diester reaction-product of a molecular quantity of an unsubstituted aliphatic diol having two primary alcohol groups, a molecular quantity of a first reactant supplying a monobasic acid radical selected from the group consisting of a monobasic aliphatic acid radical having 2 to 10 carbon atoms therein and a monobasic aromatic acid radical having 7 to 10 carbon atoms therein; a molecular quantity of an additional reactant supplying a monobasic fatty acid radical, said additional reactant being soya fatty acids, the latter supplying about 60% to about 80% of the total reactant acid radicals, said percentages being taken on the weight of the total acid radicals, said thermoplastic base being selected from the group consisting of polyvinyl chloride and co-polymers of vinyl chloride and vinylidene chloride, said co-polymers containing at least 70% by weight of the vinyl chloride and up to 30% by weight of the vinylidene chloride co-polymerized therewith.

References Cited in the file of this patent

UNITED STATES PATENTS 2,637,714    Emerson et al. _____ May 5, 1953